(12) United States Patent
Kondo et al.

(10) Patent No.: US 11,875,824 B2
(45) Date of Patent: Jan. 16, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Yosuke Kondo, Fujisawa Kanagawa (JP); Kana Furuhashi, Kawasaki Kanagawa (JP); Kazuya Takada, Chigasaki Kanagawa (JP); Eric R. Dunn, Cupertino, CA (US)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/903,785

(22) Filed: Sep. 6, 2022

(65) Prior Publication Data

US 2023/0306988 A1 Sep. 28, 2023

(30) Foreign Application Priority Data

Mar. 23, 2022 (JP) .................................. 2022-046209

(51) Int. Cl.
*G11B 27/36* (2006.01)
*G11B 20/10* (2006.01)
*G11B 5/012* (2006.01)

(52) U.S. Cl.
CPC ................... *G11B 5/012* (2013.01)

(58) Field of Classification Search
CPC ..... G11B 5/5578; G11B 5/553; G11B 19/041; G11B 20/1816; G11B 20/1883; G11B 27/36; G11B 2020/1826; G11B 2220/2508; G11B 5/00; G11B 5/54; G11B 5/5534; G11B 5/09; G11B 20/10; G06F 3/0613; G06F 3/0676
USPC ..................................................... 360/31, 39
See application file for complete search history.

(56) References Cited

U.S. PATENT DOCUMENTS

| | | | |
|---|---|---|---|
| 5,918,001 A | 6/1999 | Jeno et al. | |
| 8,516,341 B2 | 8/2013 | Kim et al. | |
| 8,966,354 B2 | 2/2015 | Morikawa | |
| 10,504,551 B1 | 12/2019 | Kitamura et al. | |
| 10,628,353 B2 * | 4/2020 | Prabhakar | G06F 3/067 |
| 10,839,840 B2 | 11/2020 | Takada et al. | |
| 2006/0171057 A1 | 8/2006 | Lee | |

* cited by examiner

*Primary Examiner* — Nabil Z Hindi
(74) *Attorney, Agent, or Firm* — Allen & Overy LLP

(57) ABSTRACT

According to an embodiment, each of a plurality of controller chips included in a magnetic disk device includes a buffer control circuit and an arbitration circuit, and controls a corresponding one of a plurality of actuator systems. The first controller chip is connected to a buffer memory via the buffer control circuit included in the first controller chip, and is connected to the second controller chip. The second controller chip is connected to the first controller chip and the third controller chip. The arbitration circuit included in the second controller chip performs arbitration between data transfer between the third controller chip and the first controller chip and data transfer between the first controller chip and an actuator system controlled by the second controller chip among the plurality of actuator systems.

11 Claims, 6 Drawing Sheets

MAGNETIC DISK DEVICE

CROSS-REFERENCE TO RELATED APPLICATIONS

This application is based upon and claims the benefit of priority from Japanese Patent Application No. 2022-046209, filed on Mar. 23, 2022; the entire contents of which are incorporated herein by reference.

FIELD

Embodiments described herein relate generally to a magnetic disk device.

BACKGROUND

A magnetic disk device is known that is capable of independently moving a plurality of magnetic heads by using a plurality of actuators.

DETAILED DESCRIPTION

A magnetic disk device according to an embodiment includes magnetic disks, a plurality of actuator systems, a plurality of controller chips, and a buffer memory. The plurality of actuator systems is configured to perform write/read on the magnetic disks. Each of the plurality of controller chips includes a buffer control circuit and an arbitration circuit, and is configured to control a corresponding one of the plurality of actuator systems. The plurality of controller chips include a first controller chip, a second controller chip, and a third controller chip. The first controller chip is connected to the buffer memory via the buffer control circuit provided in the first controller chip, and is connected to the second controller chip. The second controller chip is connected to the first controller chip and the third controller chip. The arbitration circuit included in the second controller chip is configured to perform arbitration between data transfer between the third controller chip and the first controller chip and data transfer between the first controller chip and an actuator system controlled by the second controller chip among the plurality of actuator systems.

Hereinafter, a magnetic disk device according to embodiments will be described in detail with reference to the accompanying drawings. Note that the present invention is not limited by these embodiments.

First Embodiment

Figure 1:
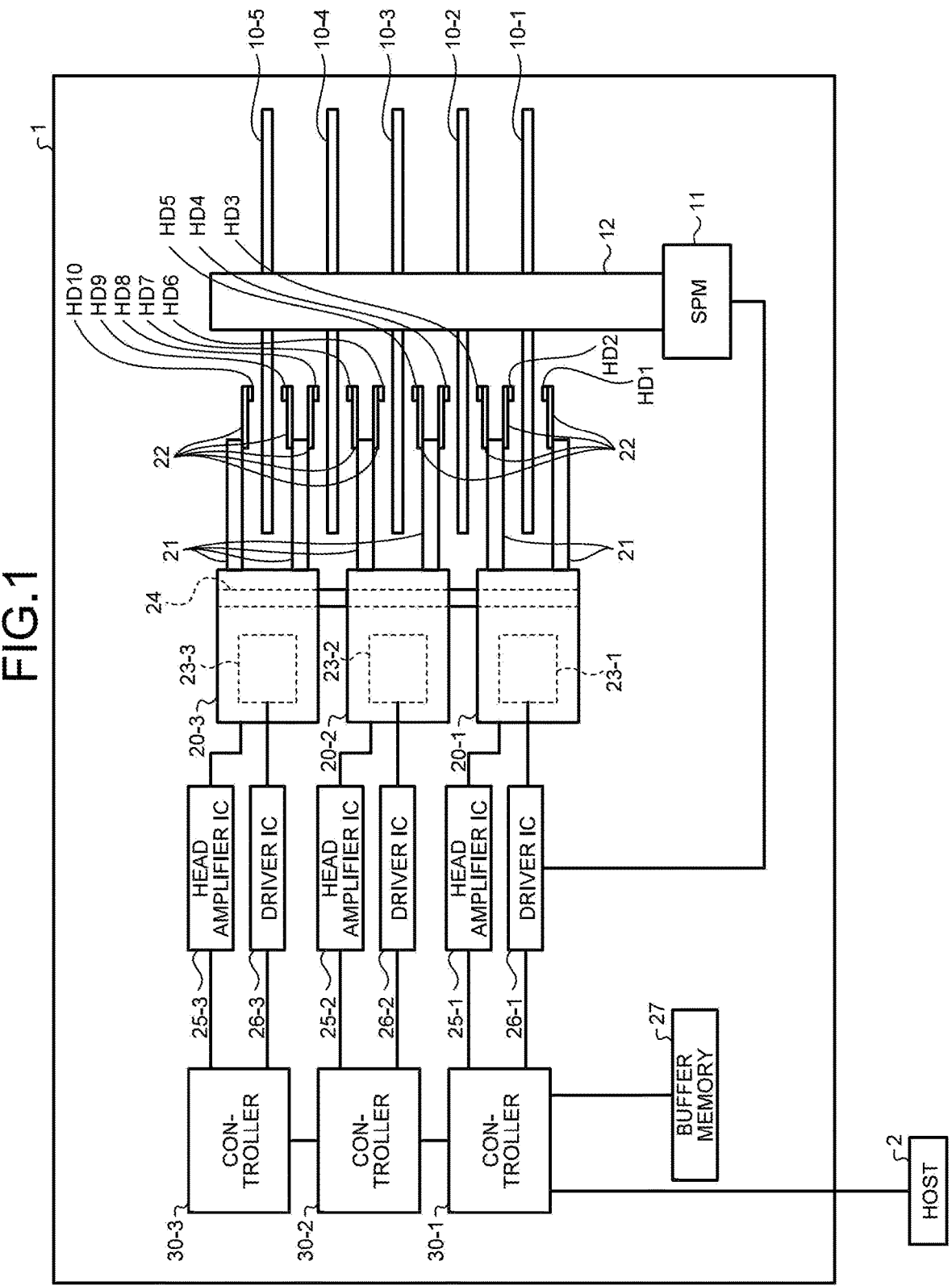
FIG. 1 is a diagram illustrating an example of a configuration of a magnetic disk device according to a first embodiment.

FIG. 1 is a diagram illustrating an example of a configuration of a magnetic disk device 1 according to the first embodiment. The magnetic disk device 1 can be connected to a host 2. The standard for a communication path between the magnetic disk device 1 and the host 2 is not limited to a specific one. In one example, Serial Attached SCSI (SAS) may be employed.

The host 2 corresponds to, for example, a processor, a personal computer, a server, or the like. The magnetic disk device 1 can receive an access command (a read command and a write command) from the host 2.

The magnetic disk device 1 includes a spindle motor (SPM) 11 and a plurality of magnetic disks 10 that rotate about a rotation shaft 12 of the spindle motor 11. In one example, the magnetic disk device 1 includes five magnetic disks 10-1, 10-2, 10-3, 10-4, and 10-5.

Recording surfaces onto which data can be recorded are formed on the front surfaces and the back surfaces of the five magnetic disks 10. That is, the five magnetic disks 10 have 10 recording surfaces. The magnetic disk device 1 includes 10 magnetic heads HD1 to HD10 corresponding to the 10 recording surfaces to respectively access the 10 recording surfaces.

A side opposite to the spindle motor 11 is hereinafter referred to as a front surface, for example. A side facing the spindle motor 11 is referred to as a back surface. Note that the definition of the front surface and the back surface are not limited thereto.

The magnetic head HD1 is provided so as to face the back surface of the magnetic disk 10-1. The magnetic head HD2 is provided so as to face the front surface of the magnetic disk 10-1. The magnetic head HD3 is provided so as to face the back surface of the magnetic disk 10-2. The magnetic head HD4 is provided so as to face the front surface of the magnetic disk 10-2. The magnetic head HD5 is provided so as to face the back surface of the magnetic disk 10-3. The magnetic head HD6 is provided so as to face the front surface of the magnetic disk 10-3. The magnetic head HD7 is provided so as to face the back surface of the magnetic disk 10-4. The magnetic head HD8 is provided so as to face the front surface of the magnetic disk 10-4. The magnetic head HD9 is provided so as to face the back surface of the magnetic disk 10-5. The magnetic head HD10 is provided so as to face the front surface of the magnetic disk 10-5.

The magnetic disk device 1 includes three or more actuator systems 20 that are individually driven. In one example, the magnetic disk device 1 includes three actuator systems 20-1, 20-2, and 20-3.

The first actuator system 20-1, one of the actuator systems 20-1, 20-2, and 20-3, includes two actuator arms 21, three suspensions 22, and a voice coil motor (VCM) 23-1. The magnetic heads HD1 to HD3 are respectively attached to the ends of the three suspensions 22.

The second actuator system 20-2, one of the three actuator systems 20-1, 20-2, and 20-3, includes two actuator arms 21, four suspensions 22, and a voice coil motor (VCM) 23-2. The magnetic heads HD4 to HD7 are respectively attached to the ends of the four suspensions 22.

The third actuator system 20-3, one of the actuator systems 20-1, 20-2, and 20-3, includes two actuator arms 21, three suspensions 22, and a voice coil motor (VCM) 23-3.

The magnetic heads HD8 to HD10 are respectively attached to the ends of the three suspensions 22.

The actuator systems 20-1, 20-2, and 20-3 are rotatable about a rotation shaft 24. The rotation shaft 24 is provided parallel to the rotation shaft 12 and apart from the rotation shaft 12. The voice coil motor 23-1 can rotate the first actuator system 20-1 about the rotation shaft 24 within a predetermined range. Therefore, the first actuator system 20-1 collectively moves the magnetic heads HD1 to HD3 relative to the counterpart recording surfaces in the radial direction.

Similarly, the voice coil motor 23-2 can rotate the second actuator system 20-2 about the rotation shaft 24 within a predetermined range. The voice coil motor 23-3 can rotate the third actuator system 20-3 about the rotation shaft 24 within a predetermined range. Therefore, the second actuator system 20-2 collectively moves the magnetic heads HD4 to HD7 relative to the counterpart recording surfaces in the radial direction. The third actuator system 20-3 collectively moves the magnetic heads HD8 to HD10 relative to the counterpart recording surfaces in the radial direction.

The magnetic disk device 1 further includes: a head amplifier IC 25-1, a driver IC 26-1, and a controller 30-1 corresponding to the first actuator system 20-1; a head amplifier IC 25-2, a driver IC 26-2, and a controller 30-2 corresponding to the second actuator system 20-2; and a head amplifier IC 25-3, a driver IC 26-3, and a controller 30-3 corresponding to the third actuator system 20-3.

Each of the head amplifier ICs 25 supplies a write current corresponding to write data output from the corresponding controller 30 to any one of the magnetic heads HD included in the corresponding actuator system 20. In addition, each of the head amplifier ICs 25 amplifies a read signal output from any one of the magnetic heads HD included in the corresponding actuator system 20 and supplies the amplified read signal to the corresponding controller 30.

Each of the driver ICs 26 supplies a drive current to the voice coil motor 23 included in the corresponding actuator system 20 under the control of the corresponding controller 30. In addition, the driver IC 26-1, one of the driver ICs 26-1, 26-2, and 26-3, supplies the drive current to the voice coil motor 23-1 and supplies another drive current for rotating the spindle motor 11 to the spindle motor 11 under the control of the controller 30-1.

The magnetic disk device 1 further includes a buffer memory 27 for data transfer between the host 2 and the group of magnetic disks 10. The buffer memory 27 holds write data received from the host 2 until writing to the magnetic disk 10 is completed, and holds data read from the magnetic disk 10 until transmission to the host 2 is completed.

The host 2 and the buffer memory 27 are connected to the controller 30-1. The controller 30-1 stores data received from the host 2 in the buffer memory 27, and stores data read from the magnetic disk 10 in the buffer memory 27. In addition, the controller 30-1 transmits data read from the magnetic disk 10 and stored in the buffer memory 27 to the host 2.

The controller 30-2 is connected to the controller 30-1. The controller 30-3 is connected to the controller 30-1 via the controller 30-2. Data transfer between the controller 30-2 and the buffer memory 27 is performed via the controller 30-1. Data transfer between the controller 30-3 and the buffer memory 27 is performed via the controller 30-1 and the controller 30-2.

Thus, according to a first embodiment, the controller 30-1, the controller 30-2, and the controller 30-3 are connected in series in this order as viewed from the host 2 and the buffer memory 27. To describe the connection relationship between these controllers 30, a side close to the host 2 may be referred to as "upstream," and a side far from the host 2 may be referred to as "downstream."

The controller 30-1 is connected to the host 2 and the buffer memory 27, and can perform data transfer directly to the host 2 and the buffer memory 27. On the other hand, the controllers 30-2 and 30-3 perform data transfer to the buffer memory 27 via at least the controller 30-1. Therefore, the controller 30-1 undertakes more functions than the controllers 30-2 and 30-3. The controller 30-1 may be referred to as a main controller in the sense that the controller 30-1 undertakes more functions than the other controllers 30. In addition, each of the controllers 30-2 and 30-3 may be referred to as a sub-controller.

The controllers 30-1, 30-2, and 30-3 have a common hardware configuration. For example, the manufacturer can assemble three controllers 30 of the same model number as the controllers 30-1, 30-2, and 30-3. The manufacturer determines whether each controller 30 functions as the controller 30-1, the controller 30-2, or the controller 30-3 by performing external pin setting, software setting, or the like on each controller 30. Therefore, the manufacturer can manufacture the magnetic disk device 1 with less labor and cost as compared with when individually designing each of the controllers 30-1, 30-2, and 30-3. The controllers 30-1, 30-2, and 30-3 may not have a common hardware configuration.

Each controller 30 is configured as a large-scale integrated circuit (LSI) called a system-on-a-chip (SoC) in which a plurality of elements are integrated on a single chip. Each controller 30 is an example of a controller chip according to the embodiment. A part of the functions of one controller 30 may be configured as another chip, or an arbitrary function may be added to each controller 30. In addition, the three controllers 30-1, 30-2, and 30-3 may be integrally sealed with resin or the like to be configured as one package.

Here, a technique to be compared with the embodiment will be described. The technique to be compared with the embodiment is referred to as a comparative example. According to the comparative example, a main controller among a plurality of controllers that individually control the actuator systems is connected to the host and the buffer memory, and one or more other controllers serving as sub-controllers are connected in series to the main controller. Each of the sub-controllers switches between data transfer via the actuator system connected to the sub-controller (referred to as first data transfer) and data transfer via the sub-controller between another sub-controller connected to a downstream side, that is, a side far from the host, and the main controller (referred to as second data transfer) by setting priorities between the first data transfer and the second data transfer.

For example, the priority of the first data transfer is set higher than that of the second data transfer. In such a case, each sub-controller cannot initiate the second data transfer while the first data transfer is being performed. When data transfer switching is performed according to the priority in this manner, the speed of data transfer is slower in the sub-controller located on the downstream side. Therefore, write/read performance has variations depending on the magnetic disk where data is stored, when viewed from the host.

In a magnetic disk device including a plurality of actuator systems, the performance is maximized when each actuator system performs write/read at a similarly high speed on the magnetic disk. However, in the comparative example, data transfer inevitably has variations in speed depending on each actuator system, and thus the performance of the magnetic disk device cannot be improved.

To counter this, in the first embodiment, an arbitration circuit 38 is provided in each controller 30 to suppress a decrease in the data transfer speed related to the controller 30 located on the downstream side.

Figure 2:
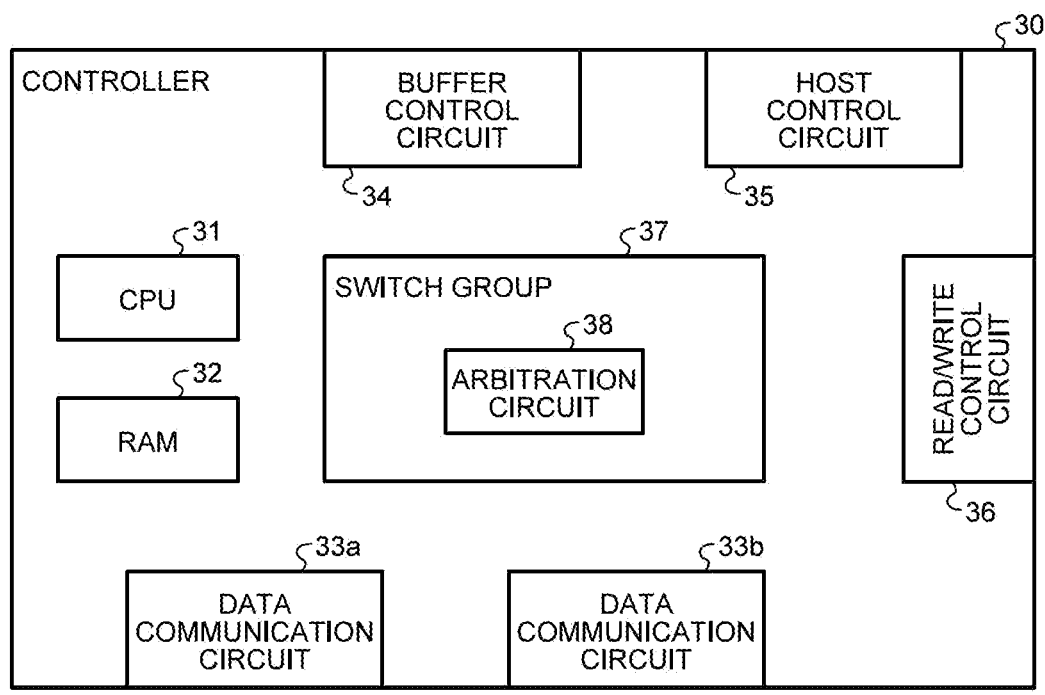
FIG. 2 is a schematic diagram illustrating an example of a hardware configuration of each of controllers according to the first embodiment.

FIG. 2 is a schematic diagram illustrating an example of a hardware configuration of each controller 30 according to the first embodiment.

The controller 30 includes a central processing unit (CPU) 31, a random access memory (RAM) 32, a data communication circuit 33a, a data communication circuit 33b, a buffer control circuit 34, a host control circuit 35, a read/write control circuit 36, a switch group 37, and an arbitration circuit 38.

The buffer control circuit 34 is a circuit that controls access to the buffer memory 27. The host control circuit 35 is a circuit that controls communication with the host 2. The data communication circuits 33a and 33b are circuits that control communication with other controllers 30.

The read/write control circuit 36 is a circuit for controlling write and read to and from the magnetic disk 10 via the head amplifier IC 25 and the actuator system 20. For example, the read/write control circuit 36 converts digital data into a signal to be supplied to the magnetic head HD, or converts a signal output from the magnetic head HD into digital data. The read/write control circuit 36 is also referred to as a read/write channel.

The CPU 31 is a processor that can execute a computer program. The CPU 31 performs control of access to the magnetic disk 10 assigned to the actuator system 20, and the like, by executing a firmware program.

The CPU 31 loads, for example, a firmware program to be executed by the CPU 31 itself into the RAM 32. Then, the CPU 31 executes the firmware program loaded into the RAM 32.

In addition, the CPU 31 included in the main controller (that is, the controller 30-1, for example) performs the following processing according to the firmware program for the main controller in addition to the above-described control. That is, the CPU 31 performs processing such as interpreting a command received from the host 2, transferring user data between the host 2 and the buffer memory 27, and assigning access to the magnetic disk 10 to any of the three actuator systems 20.

The switch group 37 switches connection between several circuits within the controller 30. That is, the connection relationship between the several circuits within the controller 30 is variable, and the connection relationship between the circuits is determined according to the connection setting input to the switch group 37.

In one example, the connection setting that defines the connection relationship between the circuits is incorporated in advance in the firmware program executed by the CPU 31. The CPU 31 inputs the connection setting incorporated in the firmware program to the switch group 37 by executing the firmware program. Then, the switch group 37 implements the connection relationship defined by the connection setting.

The switch group 37 is configured as, for example, a group of multiplexers. The connection setting is a group of selection signals input to the multiplexers constituting the switch group 37. Note that the configuration of the switch group 37 and the configuration of the connection setting are not limited thereto.

The connection setting may not be necessarily input to the firmware program or the switch group 37. The controller 30 may be configured such that an external pin is provided in the controller 30 to input the connection setting to the switch group 37 from the external pin.

When two or more data transfers collide with each other, the arbitration circuit 38 arbitrates the two or more data transfers.

Figure 3:
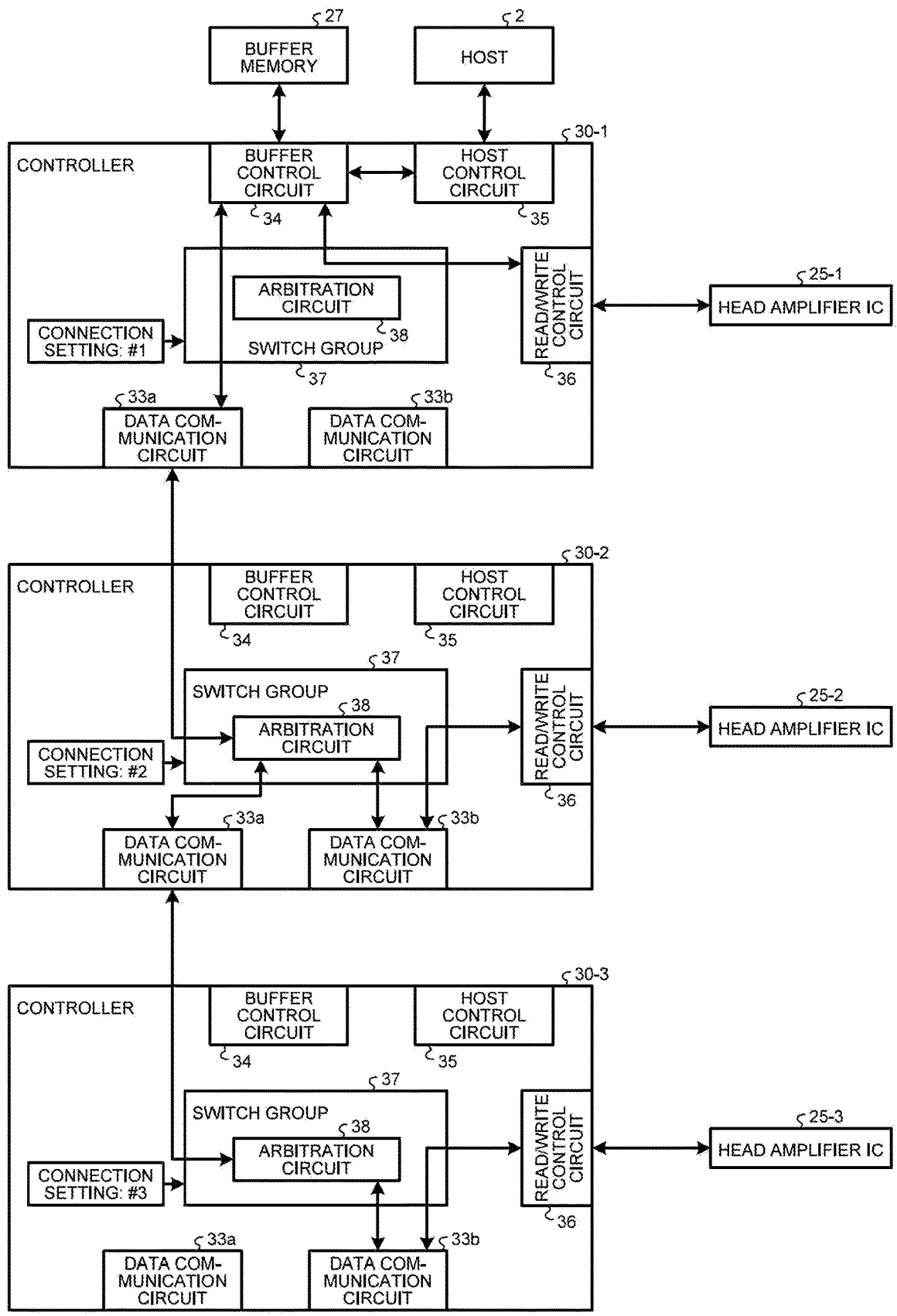
FIG. 3 is a schematic diagram illustrating an example of connection between three controllers according to the first embodiment.

FIG. 3 is a schematic diagram illustrating an example of connection between the three controllers 30 according to the first embodiment.

In the controller 30-1 serving as the main controller, a connection setting #1 is input to the switch group 37. According to the connection setting #1, the switch group 37 connects the buffer control circuit 34 and the data communication circuit 33a, and connects the buffer control circuit 34 and the read/write control circuit 36.

In the controller 30-1, data transfer between the magnetic disk 10 and the buffer memory 27 via the head amplifier IC 25-1 and the actuator system 20-1 and data transfer between the downstream controller 30 and the buffer memory 27 via the data communication circuit 33a are arbitrated by the buffer control circuit 34. The arbitration method by the buffer control circuit 34 is not limited to a specific method. In one example, a round robin method is used as the arbitration method by the buffer control circuit 34. Data transfer between the buffer memory 27 and the host 2 is controlled by the host control circuit 35.

In the controller 30-2 serving as the sub-controller, a connection setting #2 is input to the switch group 37. According to the connection setting #2, the switch group 37 connects the data communication circuit 33a of the upstream controller 30-1 and the arbitration circuit 38, connects the arbitration circuit 38 and the data communication circuit 33a, and connects the arbitration circuit 38 and the data communication circuit 33b. In addition, the switch group 37 connects the read/write control circuit 36 and the data communication circuit 33b.

In the controller 30-2, access to the actuator system 20-2 is performed via the data communication circuit 33b and the read/write control circuit 36. Data transfer between the magnetic disk 10 and the buffer memory 27 via the data communication circuit 33b, the head amplifier IC 25-2, and the actuator system 20-2, and data transfer between the downstream controller 30 and the buffer memory 27 via the data communication circuit 33a are arbitrated by the arbitration circuit 38. The arbitration method by the arbitration circuit 38 is not limited to a specific method. In one example, a round robin method is used as an arbitration method by the arbitration circuit 38.

In the controller 30-3 serving as another sub-controller, a connection setting #3 is input to the switch group 37. According to the connection setting #3, the switch group 37 connects the data communication circuit 33a of the upstream controller 30-2 and the arbitration circuit 38, connects the arbitration circuit 38 and the data communication circuit 33b, and connects the read/write control circuit 36 and the data communication circuit 33b.

In the controller 30-3, access to the actuator system 20-3 is performed via the arbitration circuit 38, the data communication circuit 33b, and the read/write control circuit 36. Since the controller 30-3 is located on the most downstream side, two or more data transfers do not collide with each other in the controller 30-3. Therefore, in the controller 30-3, the arbitration circuit 38 does not perform arbitration.

As described above, in the controller 30-2, the arbitrating circuit 38 arbitrates data transfer between the controller 30 connected to the downstream side (that is, the controller 30-3) and the controller 30-1 (more specifically, the buffer memory 27), and data transfer for the actuator system 20 controlled by the controller 30-2 itself. As a result, the controller 30-2 can suppress variations in speed between the two data transfers. Therefore, a decrease in the data transfer speed of the sub-controller located on the downstream side is suppressed, and thus the data transfer speeds for the three actuator systems can be made nearly equal to each other. Accordingly, the performance of the magnetic disk device 1 is improved.

In the above description, the three controllers 30 are connected in series as viewed from the host. Four or more controllers 30 may be connected in series. If four or more controllers 30 are connected in series, for example, the connection setting #1 is used in the controller 30 on the most upstream side, the connection setting #3 is used in the controller 30 on the most downstream side, and the connection setting #2 is used in the controllers 30 whose upstream side and downstream side are both connected to other controllers 30. As a result, even when four or more controllers 30 are connected in series, a decrease in the data transfer speed of the sub-controller located on the downstream side can be suppressed.

In addition, according to the connection example described in FIG. 3, the controllers 30-2 and 30-3 are connected in series to the controller 30-1, which is the most upstream controller 30. Two sub-controllers may be connected in parallel to the controller 30-1.

Figure 4:
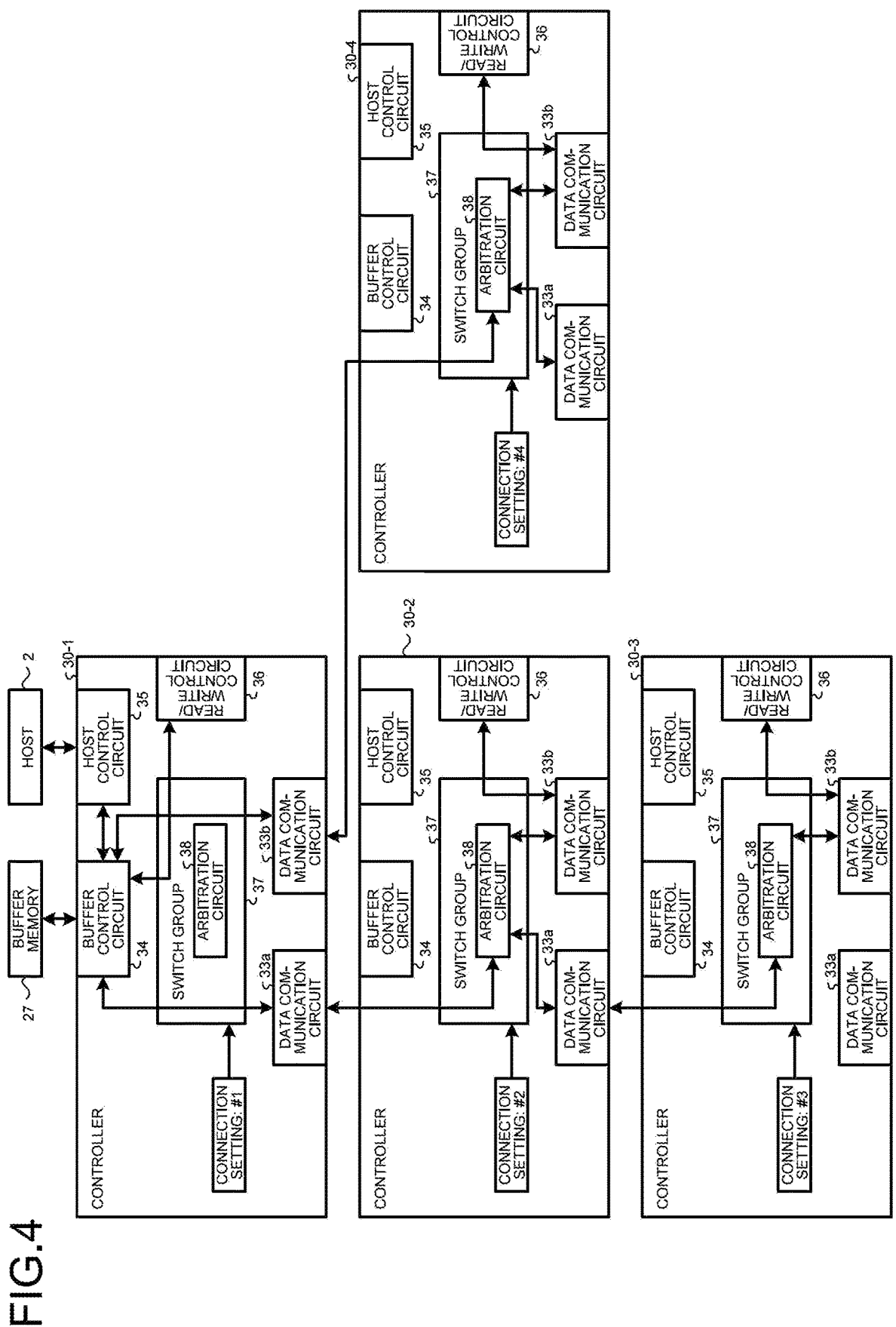
FIG. 4 is a schematic diagram illustrating another example of connection between a plurality of controllers according to the first embodiment.

FIG. 4 is a schematic diagram illustrating another example of connection between a plurality of controllers 30 according to the first embodiment. In this example, the magnetic disk device 1 includes four controllers 30.

In the example illustrated in FIG. 4, the controller 30-2 and the controller 30-3 are connected in series to the controller 30-1, which is the most upstream controller 30. More specifically, the controller 30-2 is connected to the data communication circuit 33*a* of the controller 30-1, and the controller 30-3 is connected to the data communication circuit 33*a* of the controller 30-2. The connection relationship among these three controllers 30-1, 30-2, and 30-3 is the same as the connection relationship illustrated in FIG. 3.

Another controller 30-4 is connected to the data communication circuit 33*b* of the controller 30-1. That is, the controller 30-2 and the controller 30-4 are connected in parallel to the controller 30-1.

In the controller 30-4, a connection setting #4 is input to the switch group 37. According to the connection setting #4, the switch group 37 connects the data communication circuit 33*b* of the upstream controller 30-1 and the arbitration circuit 38, connects the arbitration circuit 38 and the data communication circuit 33*b*, and connects the read/write control circuit 36 and the data communication circuit 33*b*.

In the controller 30-4, access to the actuator system 20-4 is performed via the arbitration circuit 38, the data communication circuit 33*b*, and the read/write control circuit 36. Since the controller 30-4 is located on the most downstream side, the arbitration circuit 38 does not perform arbitration.

Thus, two sub-controllers may be connected in parallel to the controller 30-1 by using the two data communication circuits 33*a* and 30*b* of the controller 30-1.

As described above, according to the first embodiment, the controller 30-1 is connected to the buffer memory 27 via the buffer control circuit 34 included in the controller 30-1 and is connected to the controller 30-2. The controller 30-2 is connected to the controller 30-1 and the controller 30-3. The arbitration circuit 38 included in the controller 30-2 performs arbitration between data transfer between the controller 30-3 and the controller 30-1 and data transfer between the actuator system 20-2 and the controller 30-1.

Therefore, a decrease in the data transfer speed of the sub-controller located on the downstream side when viewed from the host 2 is suppressed, and thus the data transfer speeds for the three actuator systems can be made nearly equal to each other. Accordingly, the performance of the magnetic disk device 1 is improved.

In addition, the arbitration method by the arbitration circuit 38 is a round robin method in the first embodiment. Note that the arbitration method by the arbitration circuit 38 is not limited thereto.

According to the first embodiment, each controller 30 includes the data communication circuit 33*a* and the data communication circuit 33*b*. The switch group 37 included in the controller 30-2 connects the data communication circuit 33*a* included in the controller 30-1 and the arbitration circuit 38 included in the controller 30-2. The switch group 37 included in the controller 30-2 connects the arbitration circuit 38 included in the controller 30-2 and the data communication circuit 33*a* included in the controller 30-2. The controller 30-3 is connected to the data communication circuit 33*a* included in the controller 30-2.

Thus, the connection relationship between the several circuits including the arbitration circuit 38 is determined by the switch group 37.

In addition, according to the first embodiment, the switch group 37 included in the controller 30-1 connects the data communication circuit 33*a* included in the controller 30-1 with the buffer control circuit 34 included in the controller 30-1. The controller 30-1 performs data transfer between the buffer memory 27 and the controller 30-2 and data transfer between the buffer memory 27 and the controller 30-3 via the data communication circuit 33*a* included in the controller 30-1 and the buffer control circuit 34 included in the controller 30-1.

The buffer control circuit 34 included in the controller 30-1 performs arbitration among data transfer between the buffer memory 27 and the controller 30-2, data transfer between the buffer memory 27 and the controller 30-3, and data transfer between the actuator system 20-1 and the buffer memory 27.

Therefore, a decrease in the data transfer speed of the sub-controller located on the downstream side when viewed from the host 2 is suppressed, and thus the data transfer speeds for the three actuator systems can be made nearly equal to each other. Accordingly, the performance of the magnetic disk device 1 is improved.

Furthermore, according to the first embodiment, the data communication circuit 33*b* included in the controller 30-1 is connected to the arbitration circuit 38 included in the controller 30-4, as described with reference to FIG. 4.

Thus, two sub-controllers may be connected in parallel to the controller 30-1.

Second Embodiment

According to the first embodiment, each of the controllers includes two data communication circuits. Each of the controllers may include three or more data communication circuits.

Figure 5:
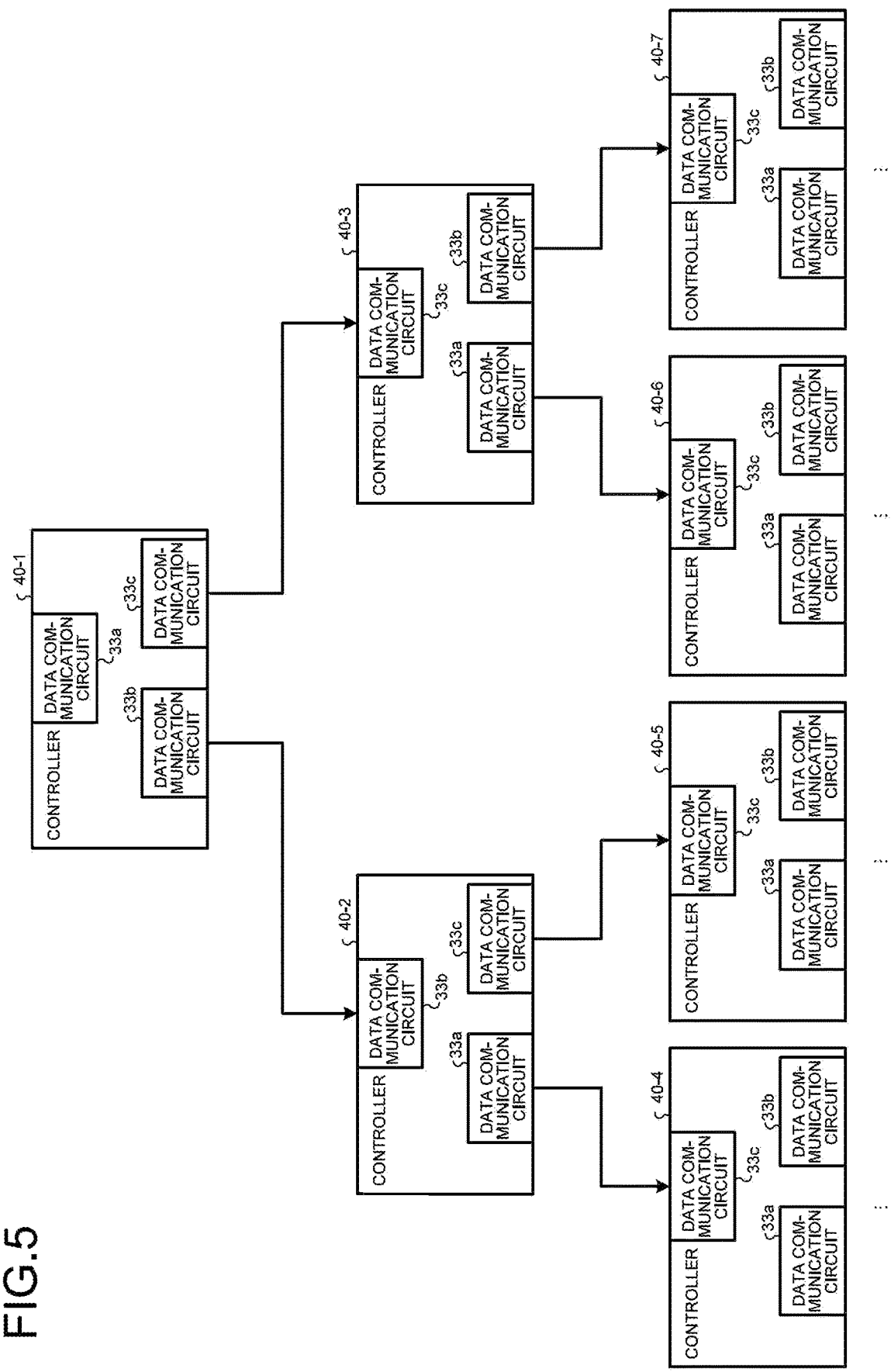
FIG. 5 is a schematic diagram illustrating another example of connection between a plurality of controllers according to a second embodiment.

For example, as illustrated in FIG. 5, each of controllers 40 includes three data communication circuits 33a, 33b, and 33c. According to the example illustrated in FIG. 5, two downstream controllers 40 are connected in parallel to not only a controller 40-1 serving as a main controller but also controllers 40-2 and 40-3 serving as sub-controllers.

By increasing the number of the data communication circuits 33 included in each controller in this manner, a plurality of sub-controllers can be connected in parallel on the downstream side of each sub-controller.

Third Embodiment

In a third embodiment, a configuration that enables arbitration of a plurality of data transfers in each controller without using an arbitration circuit will be described.

Figure 6:
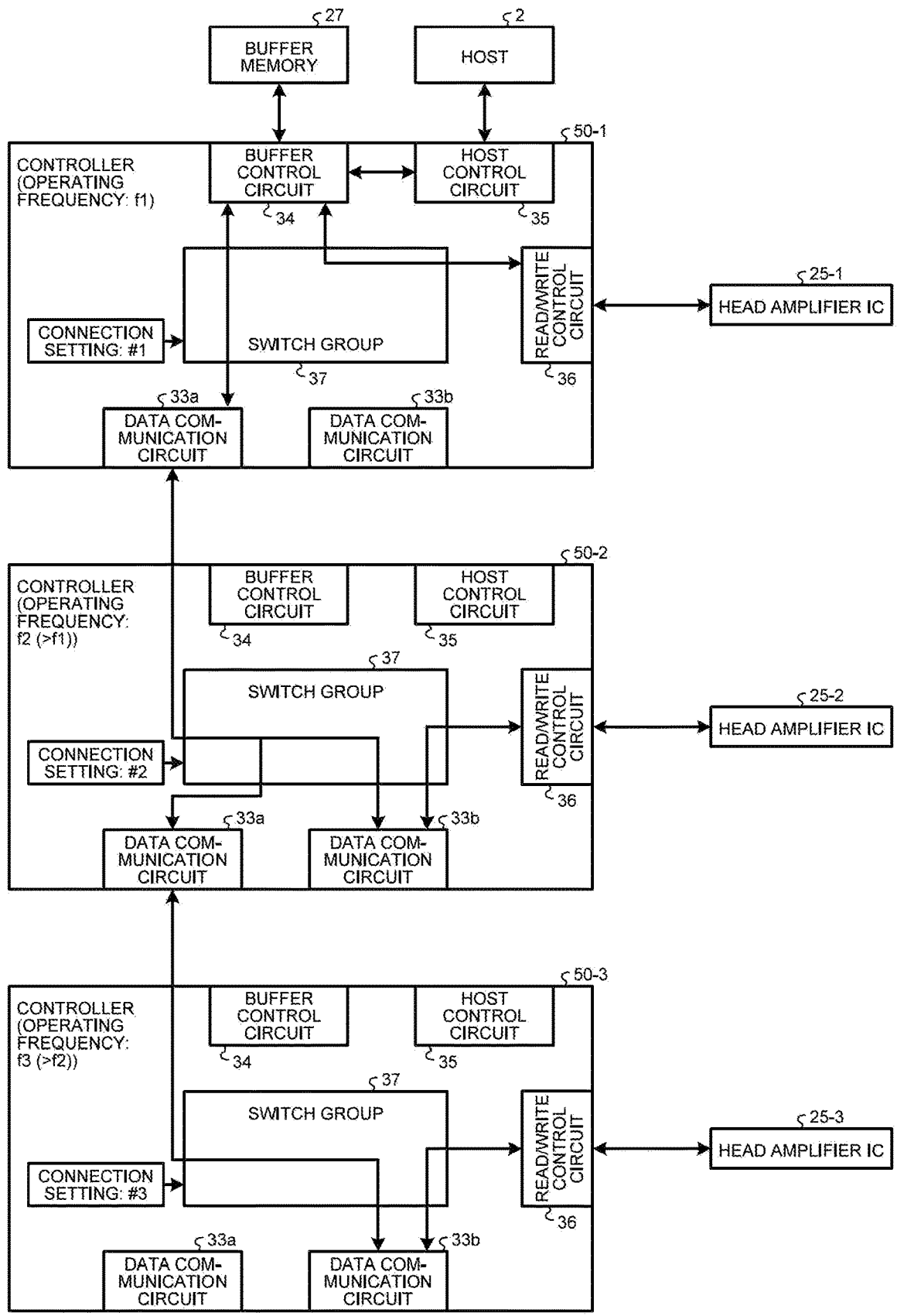
FIG. 6 is a schematic diagram illustrating another example of connection between a plurality of controllers according to a third embodiment.

For example, as illustrated in FIG. 6, if three controllers 50-1, 50-2, and 50-3 are connected in series as viewed from a host 2, the controller 50 located on the downstream side is operated at a faster frequency.

That is, each controller 50 is configured to have a variable operating frequency. According to the example illustrated in FIG. 6, the controller 50-1, which is the most upstream controller and a main controller, is set to operate at a frequency f1. The controller 50-2 connected to the controller 50-1 is set to operate at a frequency f2 that is higher than f1. The controller 50-3 connected to the controller 50-2 is set to operate at a frequency f3 that is higher than f2.

As described above, in each sub-controller 50, the more downstream it is connected, the higher the operating frequency is set. That is, the instantaneous data transfer speed for the downstream sub-controller 50 becomes high. Therefore, a decrease in the data transfer speed of the sub-controller located on the downstream side when viewed from the host 2 is suppressed, and thus the data transfer speeds for the three actuator systems can be made nearly equal to each other. Accordingly, the performance of the magnetic disk device 1 is improved.

As described above, according to the first embodiment, the second embodiment, and the third embodiment, it is possible to provide a large number of actuator systems 20 in the direction of the rotation shaft 12 while making the speed of data transfer for each actuator system 20 when viewed from the host 2 nearly uniform.

In recent years, increasing the number of mounted magnetic disks 10 by increasing the thickness of the housing of the magnetic disk device 1 in the direction of the rotation shaft 12 has been under consideration. The first embodiment, the second embodiment, or the third embodiment can also be applied to such a magnetic disk device having a large number of magnetic disks 10. According to the first embodiment, the second embodiment, and the third embodiment, it is possible to make the data transfer speed for each actuator system 20 as uniform as possible even when the number of actuator systems 20 is increased according to the number of magnetic disks 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
magnetic disks;
a plurality of actuator systems configured to perform write/read on the magnetic disks;
a plurality of controller chips each including a buffer control circuit and an arbitration circuit, each of the plurality of controller chips being configured to control a corresponding one of the plurality of actuator systems; and
a buffer memory, wherein
the plurality of controller chips include a first controller chip, a second controller chip, and a third controller chip,
the first controller chip is connected to the buffer memory via the buffer control circuit included in the first controller chip, and is connected to the second controller chip,
the second controller chip is connected to the first controller chip and the third controller chip, and
the arbitration circuit included in the second controller chip is configured to perform arbitration between data transfer between the third controller chip and the first controller chip and data transfer between the first controller chip and an actuator system controlled by the second controller chip among the plurality of actuator systems.

2. The magnetic disk device according to claim 1, wherein the arbitration is arbitration by a round robin method.

3. The magnetic disk device according to claim 1, wherein each of the plurality of controller chips includes a first communication circuit, a second communication circuit, and a switch group,
the first communication circuit included in the first controller chip and the arbitration circuit included in the second controller chip are connected by the switch group included in the second controller chip,
the arbitrating circuit included in the second controller chip and the first communication circuit included in the second controller chip are connected by the switch group included in the second controller chip, and
the first communication circuit included in the second controller chip and the third controller chip are connected.

4. The magnetic disk device according to claim 2, wherein each of the plurality of controller chips includes a first communication circuit, a second communication circuit, and a switch group,
the first communication circuit included in the first controller chip and the arbitration circuit included in the second controller chip are connected by the switch group included in the second controller chip,
the arbitrating circuit included in the second controller chip and the first communication circuit included in the second controller chip are connected by the switch group included in the second controller chip, and
the first communication circuit included in the second controller chip and the third controller chip are connected.

5. The magnetic disk device according to claim 3, wherein the first communication circuit included in the first controller chip is connected to the buffer control circuit included in the first controller chip by the switch group included in the first controller chip, and
the first controller chip is configured to perform data transfer between the buffer memory and the second controller chip and data transfer between the third controller chip and the buffer memory, via the first communication circuit included in the first controller chip and the buffer control circuit included in the first controller chip.

6. The magnetic disk device according to claim 4, wherein
the first communication circuit included in the first controller chip is connected to the buffer control circuit included in the first controller chip by the switch group included in the first controller chip, and
the first controller chip is configured to perform data transfer between the buffer memory and the second controller chip and data transfer between the third controller chip and the buffer memory, via the first communication circuit included in the first controller chip and the buffer control circuit included in the first controller chip.

7. The magnetic disk device according to claim 5, wherein
the buffer control circuit included in the first controller chip is configured to perform arbitration among data transfer between the buffer memory and the second controller chip, data transfer between the third controller chip and the buffer memory, and data transfer between the buffer memory and an actuator system controlled by the first controller chip among the plurality of actuator systems.

8. The magnetic disk device according to claim 6, wherein
the buffer control circuit included in the first controller chip is configured to perform arbitration among data transfer between the buffer memory and the second controller chip, data transfer between the third controller chip and the buffer memory, and data transfer between the buffer memory and an actuator system controlled by the first controller chip among the plurality of actuator systems.

9. The magnetic disk device according to claim 3, wherein
the plurality of controller chips further include a fourth controller chip, and
the second communication circuit included in the first controller chip is connected to the arbitration circuit of the fourth controller chip.

10. The magnetic disk device according to claim 4, wherein
the plurality of controller chips further include a fourth controller chip, and
the second communication circuit included in the first controller chip is connected to the arbitration circuit of the fourth controller chip.

11. A magnetic disk device comprising:
magnetic disks;
a plurality of actuator systems configured to perform write/read on the magnetic disks;
a plurality of controller chips each including a buffer control circuit, each of the plurality of controller chips being configured to control a corresponding one of the plurality of actuator systems; and
a buffer memory, wherein
the plurality of controller chips include a first controller chip, a second controller chip, and a third controller chip,
the first controller chip is connected to the buffer memory via the buffer control circuit included in the first controller chip, and is connected to the second controller chip, the first controller chip being configured to operate at a first frequency,
the second controller chip is connected to the first controller chip and the third controller chip, the second controller chip being configured to operate at a second frequency higher than the first frequency, and
the third controller chip is configured to operate at a third frequency higher than the second frequency.

\* \* \* \* \*